United States Patent [19]

Kessler et al.

[11] Patent Number: 4,655,792

[45] Date of Patent: Apr. 7, 1987

[54] PARTIAL OXIDATION PROCESS

[75] Inventors: Richard V. Kessler, Wappingers Falls; Mitri S. Najjar, New Windsor, both of N.Y.

[73] Assignee: Texaco Inc., White Plains, N.Y.

[21] Appl. No.: 680,724

[22] Filed: Dec. 12, 1984

[51] Int. Cl.$^4$ .............................. C10J 3/00; C10J 3/46; C10J 3/66
[52] U.S. Cl. ..................................... 48/197 R; 48/206; 48/215; 48/DIG. 7
[58] Field of Search ..................... 48/197 R, 202, 206, 48/210, 215, DIG. 2, DIG. 7, 203; 252/373

[56] References Cited

U.S. PATENT DOCUMENTS

| | | | |
|---|---|---|---|
| 2,830,883 | 4/1958 | Eastman | 48/DIG. 7 |
| 2,871,114 | 1/1959 | Eastman | 48/206 |
| 2,965,461 | 12/1960 | Walker | 48/206 |
| 2,971,830 | 2/1961 | Kawai et al. | 48/206 |
| 4,060,478 | 11/1977 | Lang | 48/197 R |
| 4,219,402 | 8/1980 | DeGeorge | 48/197 R |

FOREIGN PATENT DOCUMENTS 666119 2/1952 United Kingdom ........... 48/DIG. 2

OTHER PUBLICATIONS

Lowry, "Chemistry of Coal Utilization", vol. 1, pp. 505-524, 1945; supplementary vol., pp. 209, 822, 823, 829, 1963.
Maccormac et al., "The Gasification of Coal in an Experimental Rummel Double-Shaft Slag-Bath Gasifier", I.G.E. Journal, May 1965, pp. 385-399.
Sheludyakov et al., "Viscosity of Homogeneous Melts of Calcium Oxide-Aluminum Oxide-Silicon Dioxide-Ferrous Oxide-Magnesium Oxide Systems", Chemical Abstracts 99: 90314b, (1983).

*Primary Examiner*—Barry S. Richman
*Assistant Examiner*—Joye L. Woodard
*Attorney, Agent, or Firm*—Robert A. Kulason; James J. O'Loughlin; Albert Brent

[57] ABSTRACT

An ash fusion temperature reducing agent comprising a comminuted ore mixture of the silicates of iron, calcium, magnesium and aluminum is mixed with an ash containing pumpable liquid hydrocarbonaceous material to produce Mixture A. Mixture A is reacted with a free-oxygen containing gas in a partial oxidation gas generator. A hot raw effluent gas stream comprising $H_2+CO$ along with molten ash having a reduced ash fusion temperature are produced at a lower temperature. Alternatively, Mixture A may be first introduced into a coking zone and converted into petroleum coke in which the ash fusion temperature reducing agent is dispersed throughout. The petroleum coke is then introduced into the partial oxidation gas generator where the hot raw effluent gas stream comprising $H_2+CO$ is produced along with molten petroleum coke ash having a reduced ash fusion temperature. The molten ash is readily separated from the effluent gas stream and the gas generator may be operated at a lower temperature thereby extending the life of the refractory lined reaction zone.

15 Claims, No Drawings

PARTIAL OXIDATION PROCESS

FIELD OF THE INVENTION

This invention relates to the partial oxidation of ash-containing liquid hydrocarbonaceous materials, ash-containing petroleum coke, or both to produce gaseous mixtures comprising $H_2+CO$. More particularly it pertains to the partial oxidation of ash-containing liquid hydrocarbonaceous fuel, ash-containing petroleum coke or both to produce synthesis gas along with molten ash having a reduced ash fusion temperature.

The partial oxidation of liquid hydrocarbonaceous fuels such as petroleum products and slurries of solid carbonaceous fuels such as coal and petroleum coke are well known processes. The foreseeable trend for petroleum reserves is that the produced crude will be increasingly heavier and of poorer quality. To compensate for this trend, refiners must employ more "bottom of the barrel" upgrading to provide the desired light products. The current industry workhorse to provide this upgrading is some type of coking operation (either delayed or fluid). A good deal of current refinery expansion includes the installation or expansion of coker units, and thus, coking will be a process of general use for some time to come.

A major drawback for coking is the disposal of the product coke. With a reasonably clean coker feed, the product coke has been substituted for applications requiring only relatively pure carbon, such as electrode manufacture. However, with the feed crudes becoming poorer, there are compounding factors affecting coker operations. First, since the crudes contain more contaminants, i.e. sulfur, metals (predominantly vanadium, nickel, and iron), and ash, and these contaminants are concentrated in the product coke, this coke is of a much poorer quality and is excluded from its normal product applications. Second, because the crudes are heavier, i.e., contain more coke precursors, more of this poorer quality coke is produced from each barrel of feed crude. The manufacture of petroleum coke pellets by a delayed coking process is described in coassigned U.S. Pat. No. 3,673,080. A fluid coking process is described in U.S. Pat. No. 2,709,676.

The Texaco partial oxidation gasification process offers an alternative processing route for the coke. For example, water slurries of petroleum coke are reacted by partial oxidation in coassigned U.S. Pat. No. 3,607,157. Gasification is often cited as a convenient means of coke disposition. The Flexicoking Process is an integrated coker/gasifier operation but is often criticized because of the gasifier design. Further, no molten petroleum coke ash having a reduced ash fusion temperature is produced. The decision to use gasification as a coke disposal means is generally based on economics. The expected rise in energy costs and legislation (primarily Canadian) requiring total use of feed crude should shortly bring about a great utilization of petroleum coke feeds to the partial oxidation gas generator.

Previous gasification runs with delayed coke gave rise to some unexpected operating problems. The ash, which normally melts and is discharged from the gasifier as a slag, was not melting completely and being discharged but was building up on the walls of the refractory. The use of fluxing additives normally used for coal operations did not alleviate the problem. By the subject invention, the ash from the liquid hydrocarbonaceous fuel and/or solid carbonaceous fuel is combined with an ash fusion temperature reducing agent and is easily removed from the reaction zone as molten slag at a lower temperature.

SUMMARY OF THE INVENTION

In accordance with the invention there is provided a process for the production of gaseous mixtures comprising $H_2+CO$ comprising: (1) mixing an ash fusion temperature reducing agent comprising a comminuted ore having a particle size of ASTM E-11 Standard Sieve Designation in the range of about 210 microns to 37 microns, or below with a pumpable ash-containing liquid hydrocarbonaceous material and/or ash-containing petroleum coke, wherein said comminuted ore principally comprises in weight percent monoclinic amphibole and/or pyroxene minerals in which the following elements are present in weight percent (basis ore): iron in the range of about 5–55, calcium in the range of about 1–10, silicon in the range of about 4–25, magnesium in the range of about 1–10, and aluminum in the range of about 0.25–5.0; and wherein the weight ratio of ash fusion temperature reducing agent to molten ash produced in (2) is in the range of about 0.5–10; (2) reacting said mixture from (1) at a temperature in the range of about 2100° F. to 2700° F. and a pressure in the range of about 1 to 200 atmospheres in a free-flow partial oxidation reaction zone with a free oxygen containing gas in the presence of a temperature moderator to produce a hot raw effluent gas stream comprising $H_2+CO$ along with molten ash having a reduced ash fusion temperature; and (3) separating said molten ash from said hot raw effluent gas stream. In another embodiment of the invention, the comminuted ash fusion temperature reducing agent is mixed with an ash-containing heavy liquid hydrocarbonaceous material and coked. The resulting ash-containing petroleum coke which contains dispersed throughout said ash fusion temperature reducing agent, is then introduced into the partial oxidation reaction zone in (2) above. By the subject process, the initial ash fusion temperature for the ash derived from the partial oxidation of the ash-containing liquid hydrocarbonaceous material and/or ash-containing petroleum coke may be reduced in the range of about 100° F. to 600° F. Partial oxidation gas generators may now be run in the slagging mode at lower temperatures. The life of the refractory lining of the reaction zone is thereby extended at a great cost savings.

DISCLOSURE OF THE INVENTION

Closer study of the ash derived from the partial oxidation of liquid hydrocarbonaceous fuels and/or petroleum coke shows that they are largely composed of oxide and sulfide compounds of vanadium, nickel, iron, along with some normally occurring mineral matter species similar to that found in coal mineral matter. The metals present in the ash provide a system that is significantly different from that occurring in coal. A further factor is that the total ash content of the petroleum coke may only be about one half to 5 percent, whereas coal typically contains 10–20 percent ash. The comparatively low ash concentration in petroleum coke apparently is the reason that the ash removal problem is only noticed after prolonged gasifier runs. The chance for effective ash/additive mixing that is necessary to achieve ash fusion temperature modification is therefore greatly reduced. Moreover, it is theorized that in the liquid hydrocarbonaceous material and petroleum coke systems, a good deal of the ash material is liberated as individual molecular species. This is because upon vacuum distillation or coking, the metallic species in the crude, which are generally presented as porphyrin type structures (metal atoms, oxides or ions thereof confined in an organic framework), are entrapped within the collapsed carbon matrix. This invention provides an improved ash fusion temperature reducing agent. Further, a means of introducing this agent into the system to give maximum effectiveness is provided.

By definition, the term ash-containing liquid hydrocarbonaceous material or fuel is a petroleum or coal derived fuel selected from the group consisting of virgin crude, reduced crude, heavy slops and naphthas, vacuum tower bottoms or feeds, residual fuel oil, decanted oil from a catalytic cracker, heavy fuel oil slurry, heavy gas oils, asphalt, tar sands bitumen, shale oil, coal derived oil, and mixtures thereof. One embodiment of the subject invention involves mixing the improved comminuted ash fusion temperature reducing agent with ash-containing liquid hydrocarbonaceous fuel, or comminuted ash-containing petroleum coke, or both and introducing the mixture into the partial oxidation gasifier. In another embodiment the ash fusion temperature reducing agent is mixed with the liquid hydrocarbonaceous material and first fed into a coker. By this means, the finely ground agent may be intimately mixed throughout the petroleum coke product. The preferable particle size of the comminuted ash fusion temperature modifying agent and the comminuted petroleum coke is in the range of ASTM E-11 Standard Sieve Designation about 210 microns to 37 microns, or below. In another embodiment, the ash-containing petroleum coke is ground together with the ash fusion temperature reducing agent. Intimate mixing of the materials is thereby achieved, and the particle sizes of each material are substantially the same. The ground mixture is then mixed with water or a liquid hydrocarbonaceous material or both to produce a pumpable slurry. Alternatively, the solid materials may be wet ground with the liquid slurry medium.

In another embodiment, the ash fusion temperature reducing agent is mixed with the liquid hydrocarbonaceous material and fed into a coker. The actual operation can be accomplished for example by mixing the agent into the ash-containing petroleum liquid feed to the vacuum distillation tower, which normally precedes the coker unit. In either unit operation (coking or distillation), the agent should predominately stay behind in the desired bottoms stream. In other words, there should be little, if any, carry over of agent with the lighter products. A possible advantage for mixing the agent into the vacuum tower feedstream in preference to the bottoms stream (i.e. coker feed) is that the feed to the vacuum tower is significantly less viscous than the bottoms from the vacuum tower. A more thorough mixing may be thereby effected.

In one embodiment a mixture of high boiling liquid petroleum i.e. liquid hydrocarbonaceous fuel and comminuted coke ash fusion temperature reducing agent at a temperature in the range of about 650° F. to 930° F. is introduced into a delayed coking zone for example by way of line 33, such as shown and described in coassigned U.S. Pat. No. 3,673,080, which is incorporated herein by reference. At a temperature in the range of about 800° F. to 895° F. and a pressure in the range of about 20 to 60 psig, uncondensed hydrocarbon effluent vapor and steam are removed overhead and petroleum coke is removed from the bottom of said delayed coking zone. By definition, ash from liquid hydrocarbonaceous material or petroleum coke ash comprises mostly the oxides and possibly the sulfides of Ni, V, and Fe along with a minor amount of the oxides selected from the group consisting of Si, Al, Ca, Ti, Cr, and mixtures thereof. While the metal concentrations in the liquid hydrocarbonaceous material may comprise Ni 0.5 to 610 ppm (parts per million), V 2.0–1500 ppm, and Fe 0.5 to 75 ppm; the metal concentrations in the petroleum coke product may comprise Ni 2.0 to 3100 ppm, V 8.0 to 7400 ppm, and Fe 2.0 to 380 ppm.

In another embodiment the mixture of high boiling liquid petroleum and comminuted coke ash fusion temperature reducing agent at a temperature in the range of about 550° F. to 750° F. is introduced into a fluidized bed coking zone for example by way of line 31, such as shown and described in U.S. Pat. No. 2,709,676, which is incorporated herein by reference. At a temperature in the range of about 1000° F. to 1200° F. and a pressure in the range of about 10 to 20 psig, uncondensed hydrocarbon effluent vapor and steam are removed overhead and said petroleum coke is removed from the bottom of said coking zone.

Another aspect of this invention is that the ash fusion modifying agent involved may be selected on the basis of serendipitous catalytic properties in addition to their primary function of ash fusion modification. They may act to produce more and/or better quality light products from the coker operation. They may also aid in the gasification reactions either by increasing the reaction rate and thus the throughput capacity of the gasifier or by increasing the conversion of the soot and thus the overall efficiency of the process. Again, however, this invention does not depend on the catalytic properties of the agent.

It was unexpectedly found that a preferred ash fusion temperature reducing agent for the ash in liquid hydrocarbonaceous material or in petroleum coke comprises a comminuted ore of monoclinic amphibole and/or pyroxene minerals in which the following elements are present in weight percent (basis ore): iron in the range of about 5–55, calcium in the range of about 1–10, silicon in the range of about 4–25, magnesium in the range of about 1–10, and aluminum in the range of about 0.25–5.0.

Thus, the comminuted ore may principally comprise a mixture of the silicates of iron, calcium, magnesium, and aluminum. For example, the ash fusion temperature reducing agent may be principally comprised of a naturally occurring mineral selected from the group consisting of Hedenbergite, Hornblende, Grunerite, and mixtures thereof.

The weight ratio of ash fusion temperature reducing agent to the molten ash produced by the partial oxidation of an ash-containing liquid hydrocarbonaceous material and/or an ash-containing petroleum coke is in the range of about 0.5 to 10, much as about 1 to 3.

In other embodiments, this invention may be applied to other similar petroleum processes that produce a stream suitable for gasification. Any "bottom of the barrel" process that does not upgrade the bottoms or residue stream to extinction must ultimately produce such a stream. These streams, either liquid or normally solid but pumpable at elevated temperatures, will produce the same gasification problems as discussed for coke. Thus, the invention of introducing an ash fusion modifying agent as part of the petroleum processing prior to gasification should, depending on the specific process, produce a gasified feed that will be free of the gasification problems mentioned above. Most of these processes employ vacuum distillation as pretreatment. Accordingly, as described above, the ash fusion temperature reducing agent may be mixed into the vacuum distillation feed. The agent then will emerge from the distillation in the bottoms stream. In turn the bottoms stream is the feed stream for the upgrading process. This incorporation of the agent should not adversely affect these processes, and the agent should ultimately emerge with the residue stream from each respective process. In all these processes, this residue stream should be suitable for gasification by partial oxidation.

In one embodiment, synthesis gas substantially comprising in mole % dry basis $H_2$ 25 to 45, CO 20 to 50, $CO_2$ 5 to 35, $CH_4$ 0.06 to 8.0, and $CO_2 + H_2S$ 0.1 to 2.0 may be produced in a free-flow partial oxidation reaction zone, such as that shown and described in coassigned U.S. Pat. No. 3,607,157, which is incorporated herein by reference. For example, an atomized aqueous dispersion or a dispersion of substantially dry petroleum coke entrained in a gaseous transport medium is introduced into a free-flow partial oxidation gas generator. The gaseous transport medium may be selected from the group consisting of steam, $CO_2$, $N_2$, free-oxygen containing gas, and recycle synthesis gas. The petroleum coke contains uniformly dispersed therein sufficient ash fusion temperature reducing agent to provide a weight ratio of ash fusion temperature reducing agent to the ash produced in a subsequent partial oxidation zone in the range of about 0.5 to 10.0. In another embodiment the petroleum coke containing said ash fusion temperature reducing agent is introduced into the free-flow partial oxidation zone as a pumpable slurry of petroleum coke in water, liquid hydrocarbonaceous fluid, or mixtures thereof. The solids content of the slurry is in the range of about 50-65 weight percent.

The petroleum coke is reacted with a free-oxygen containing gas e.g. air, oxygen-enriched air, substantially pure oxygen, in the presence of a temperature moderator e.g. $H_2O$, $CO_2$, $N_2$, in the refractory lined partial oxidation synthesis gas generation zone at an autogenous temperature in the range of about 2100° F. to 2700° F., such as about 2150° F. to 2400° F., and a pressure in the range of about 1 to 200 atmospheres, such as about 6 to 60 atmospheres. The molten slag droplets are readily separated from the hot effluent gas stream leaving the reaction zone by gravity or by quenching and/or scrubbing the gas stream with water or other gas scrubbing medium. The petroleum coke ash entrained in the hot raw effluent gas stream comprising $H_2 + CO$ has an initial ash deformation temperature in the range of about 2100° F. to 2700° F., such as about 2150° F. to 2400° F. This is a reduction in the range of about 100° F. to 600° F. in comparison with the initial deformation temperature of the ash derived from the partial oxidation of ash-containing liquid hydrocarbonaceous materials or petroleum coke but without the addition of the subject ash fusion temperature reducing agent.

Advantages of the present invention are illustrated by the following specific examples. These examples are set forth for purpose of illustration and should not be construed as limiting the invention.

EXAMPLE I

Run No. 1—The initial distortion temperature of ash produced by the partial oxidation of aqueous slurries of petroleum coke was determined to be greater than 2700° F. when tested according to ASTM Test Method E-1857. The petroleum coke was derived from the delayed coking of Alaskan heavy crude. The particle size of the petroleum coke ash was in the range of ASTM E-11 Standard Sieve Designation about 0.1 microns to 210 microns. The ash content of the petroleum coke was 0.4 wt. %.

Run No. 2—A petroleum coke ash fusion temperature reducing agent as shown in Table I, was intimately mixed with a portion of the ash derived from the partial oxidation of petroleum coke as provided in Run No. 1 to produce a mixture having a weight ratio of coke ash fusion temperature reducing agent to ash produced by the partial oxidation of said petroleum coke of about 3. The particle size of the coke ash fusion temperature reducing agent was in the range of ASTM E-11 Standard Sieve Designation about 0.1 microns to 210 microns. In accordance with ASTM Test Method D-1857, the initial deformation temperature, softening temperature, and fluid temperature were determined for said mixture. The results are reported in Table I. The results show that the initial deformation temperature of the petroleum coke ash of greater than 2700° F. is reduced from about 350° F. to 500° F. by the addition of the petroleum coke ash fusion temperature reducing agent. Accordingly, when the subject ash fusion temperature reducing agents are introduced into a partial oxidation gas generator as part of the ash-containing coke feed, gaseous mixtures comprising $H_2 + CO$ and containing molten ash having a reduced ash fusion temperature are produced.

TABLE I

| REDUCTION OF COKE ASH FUSION TEMPERATURE | | | |
|---|---|---|---|
| | ASH FUSION TEMPERATURE REDUCING AGENTS | | |
| | Hedenbergite | Hornblende | Gruenerite |
| INITIAL DEFORMATION TEMPERATURE, °F. | 2354 | 2206 | 2230 |
| SOFTENING TEMPERATURE, °F. | 2368 | 2243 | 2328 |
| FLUID TEMPERATURE, °F. | 2421 | 2396 | 2410 |

Although modifications and variations of the invention may be made without departing from the spirit and scope thereof, only such limitations should be imposed as are indicated in the appended claims.

We claim:
1. A process for the production of gaseous mixtures comprising $H_2 + CO$ comprising:
   (1) mixing an ash fusion temperature reducing agent comprising a comminuted ore having a particle size of ASTM E-11 Standard Sieve Designation in the range of about 0.1–210 microns with at least one material selected from the group consisting of a pumpable ash-containing liquid hydrocarbonaceous material and ash-containing petroleum coke; wherein the ash from said liquid hydrocarbonaceous material or petroleum coke principally comprises the oxides of Ni, V, and Fe along with a minor amount of the oxides selected from the group consisting of Si, Al, Ca, Ti, Cr, and mixtures thereof; where the weight ratio of ash fusion temperature reducing agent to ash produced in (2) is in the range of about 0.5 to 10, and wherein said comminuted ash fusion temperature reducing agent principally comprises monoclinic amphibole and/or pyroxene minerals in which the following elements are present principally as silicate compounds in weight percent (basis ore): iron in the range of about 5–55, calcium in the range of about 1–10, silicon in the range of about 4–25, magnesium in the range of about 1–10, and aluminum in the range of about 0.25–5.0;

(2) reacting said mixture from (1) at a temperature in the range of about 2100° F. to 2700° F. and a pressure in the range of about 1 to 200 atmospheres in a free-flow refractory lined partial oxidation reaction zone with a free-oxygen containing gas in the presence of a temperature moderator to produce a hot raw effluent gas stream comprising $H_2+CO$ along with molten ash having a reduced ash fusion temperature; and (3) separating said molten ash from said hot raw effluent gas stream.

2. The process of claim 1 wherein said ash fusion temperature reducing agent is principally comprised of naturally occurring minerals selected from the group consisting of Hedenbergite, Hornblende, Grunerite, and mixtures thereof.

3. The process of claim 1 wherein the petroleum coke from (1) is introduced into the free-flow partial oxidation zone in (2) as a pumpable slurry of petroleum coke in water, liquid hydrocarbonaceous fluid or mixtures thereof, or as substantially dry petroleum coke entrained in a gaseous transport medium.

4. A process for the production of gaseous mixtures comprising $H_2+CO$ comprising:
(1) disseminating a comminuted petroleum coke ash fusion temperature reducing agent comprising a comminuted ore principally comprising a mixture of the silicates of iron, calcium, magnesium and aluminum in which said elements are present as follows in weight percent (basis ore): iron about 5–55, calcium about 1–10, silicon about 4–25, magnesium about 1–10, and aluminum about 0.25–5.0 into an ash-containing heavy liquid hydrocarbonaceous material so that the weight ratio of petroleum coke ash fusion temperature reducing agent to molten ash produced in (3) is in the range of about 0.5 to 10.0; wherein the ash in said heavy liquid hydrocarbonaceous material principally comprises the oxides and possibly the sulfides of Ni, V, and Fe along with a minor amount of the oxides selected from the group consisting of Si, Al, Ca, Ti, Cr, and mixtures thereof;

(2) coking said mixture of coke ash fusion temperature reducing agent and ash-containing heavy liquid hydrocarbonaceous material from (1) to produce petroleum coke containing dispersed therein said petroleum coke ash fusion temperature reducing agent; and (3) reacting a pumpable slurry comprising said petroleum coke from (2) containing said ash fusion temperature reducing agent and a carrier selected from the group consisting of water, liquid hydrocarbonaceous fluid, and mixtures thereof in a free-flow partial oxidation refractory lined reaction zone with a free-oxygen containing gas in the presence of a temperature moderator and at a temperature in the range of about 2100° F. to 2700° F. and a pressure in the range of about 1 to 200 atmospheres to produce a hot raw effluent gas stream comprising $H_2+CO$ along with molten ash having a reduced ash fusion temperature.

5. The process of claim 4, wherein said comminuted petroleum coke ash fusion temperature reducing agent comprises monoclinic amphibole and/or pyroxene minerals.

6. The process of claim 4, wherein said comminuted petroleum coke ash fusion temperature reducing agent is principally comprised of naturally occurring minerals selected from the group consisting of Hedenbergite, Hornblende, Grunerite, and mixtures thereof.

7. The process of claim 4, wherein said petroleum coke ash fusion temperature reducing agent has a particle size of ASTM E-11 Standard Sieve Designation of about 0.1–210 microns.

8. The process of claim 4 wherein said petroleum coke ash fusion temperature reducing agent has a particle size of ASTM E-11 Standard Sieve Designation in the range of about 210 microns to 37 microns.

9. The process of claim 4 wherein the weight ratio of coke ash fusion temperature reducing agent in (1) to molten petroleum coke ash in (3) is in the range of about 1–3.

10. The process of claim 4 wherein said ash-containing heavy liquid hydrocarbonaceous is a high boiling liquid petroleum feed to or the bottoms from a vacuum tower or a fractionator.

11. The process of claim 4 provided with the step of separating the petroleum coke ash from the hot raw effluent gas stream.

12. The process of claim 4 wherein the petroleum coke from (2) is introduced into the free-flow partial oxidation zone in (3) as substantially dry petroleum coke entrained in a gaseous transport medium.

13. A process for the production of gaseous mixtures comprising $H_2+CO$ comprising:
(1) mixing a comminuted coke ash fusion temperature reducing agent having a particle size of ASTM E-11 Standard Sieve Designation in the range of about 0.1–210 microns and principally comprising a mixture of the silicates of iron, calcium, silicon, magnesium and aluminum in which said elements are present as follows in weight percent (basis ore): iron about 5–55, calcium about 1–10, silicon about 4–25, magnesium about 1–10, and aluminum about 0.25–5.0 with an ash-containing liquid petroleum material; wherein the weight ratio of coke ash fusion temperature reducing agent added to the coke ash produced in (3) is in the range of about 0.5 to 10.0; wherein the ash in said liquid petroleum principally comprises the oxides of Ni, V and Fe;

(2) introducing the mixture of ash-containing liquid petroleum and comminuted petroleum coke ash fusion temperature reducing agent from (1) at a temperature in the range of about 650° F. to 930° F. into a delayed coking zone where at a temperature in the range of about 800° F. to 895° F. and a pressure in the range of about 20 to 60 psig, uncondensed hydrocarbon effluent vapor and steam are removed overhead and said petroleum coke is removed from the bottom containing uniformly dispersed therein petroleum coke ash fusion temperature reducing agent;

(3) reacting a pumpable slurry comprising said petroleum coke from (2) containing said ash fusion temperature reducing agent and a carrier selected from the group consisting of water, liquid hydrocarbonaceous fluid, and mixtures thereof in a free-flow partial oxidation refractory lined reaction zone with a free-oxygen containing gas in the presence of a temperature moderator and at a temperature in the range of about 2100° F. to 2700° F. and a pressure in the range of about 1 to 200 atmospheres to produce a hot raw effluent gas stream comprising $H_2+CO$ along with molten petroleum coke ash having an initial ash deformation temperature in the range of about 2100° F. to 250° F.; and (4) separating said molten petroleum coke ash having a reduced ash fusion temperature from said hot raw effluent gas stream.

14. The process of claim 13 where in place of said delayed coking zone in (2) the mixture of ash-containing liquid petroleum and comminuted coke ash fusion temperature reducing agent at a temperature in the range of about 550° F. to 750° F. is introduced into a fluidized bed coking zone where at a temperature in the range of about 1000° F. to 1200° F. and a pressure in the range of about 10 to 20 psig, uncondensed hydrocarbon effluent vapor and steam are removed overhead and said petroleum coke is removed from the bottom.

15. The process of claim 13 provided with the step of separating said petroleum coke ash from said hot effluent gas stream from (4) with a water or oil scrubbing medium.

* * * * *